Patented Apr. 14, 1942

2,279,291

UNITED STATES PATENT OFFICE 2,279,291

ISOMERIZING HYDROCARBONS

Harry A. Cheney, Berkeley, Calif., assignor to Shell Development Company, San Francisco, Calif., a corporation of Delaware No Drawing. Application April 22, 1941, Serial No. 389,771

15 Claims. (Cl. 260—676)

The present invention relates to a new and improved method for the isomerization of saturated hydrocarbons, and more particularly saturated hydrocarbons containing from four to nine carbon atoms. A particular embodiment of the invention relates to an improved method whereby butane and/or pentane can be more efficiently isomerized.

Saturated hydrocarbons containing at least four carbon atoms are capable of existing in isomeric modifications, the number of which increases rapidly with the increase of the number of carbon atoms in the molecule. Notwithstanding the large number of isomeric forms possible, the hydrocarbons containing, for example, from four to nine carbon atoms in the molecule and available in natural sources such as petroleum and in certain distillate products of many ordinary refinery operations consist predominantly of the normal modification. The greater part of these hydrocarbons is used in fuels for internal combustion engines. Studies of the chemical activities and the ignition characteristics of a large number of the possible isomers have shown that certain isomeric modifications are vastly superior to others and that, in general, the naturally occurring normal isomers are often the least preferred. Normal pentane, for example, is chemically quite unreactive and in view of its poor ignition characteristics is a poor fuel component for internal combustion engines. Its isomer, isopentane, on the other hand, is far more reactive chemically and can be alkylated readily with olefinic hydrocarbons to produce saturated higher molecular weight hydrocarbons having excellent ignition characteristics. Isopentane is, of itself, an exceptionally valuable motor fuel component. In view of the vastly superior properties of the highly branched hydrocarbons over the normal or less branched hydrocarbons, a process enabling the efficient conversion of the normal or less branched hydrocarbons, available in large quantities, to their more highly branched forms is very desirable.

It is well known that isomerization of saturated hydrocarbons can be catalyzed by the aluminum halides. Normal butane, for example, is isomerized at room temperature in a period of about a month to an equilibrium mixture of normal butane and isobutane containing about 80% isobutane in the presence of aluminum bromide or aluminum chloride. It is also known that the presence of a hydrogen halide, such as hydrogen chloride, accelerates the reaction, and it was recently found that by the use of a large partial pressure of hydrogen chloride such isomerization reactions may be made to approach a practical rate. The aluminum halides, however, per se, even in the presence of a hydrogen halide, are not entirely satisfactory catalysts for hydrocarbon isomerization. At low temperatures the isomerization rate is usually too slow for practical consideration and at higher temperatures these catalysts tend to cause degradation reactions which lead to the formation of by-products which, in turn, polymerize and undergo other secondary reactions. These by-products even when formed in relatively small amounts quickly coat the catalyst particles, preventing efficient contact, and cause the particles of aluminum halide to agglomerate into sticky lumps which slowly change to an oily liquid. This oily liquid has a certain catalytic activity and is capable of catalyzing polymerization and similar reactions but is much less active than the aluminum halides as an isomerization catalyst.

In view of these practical difficulties, considerable work has been done in an effort to discover a better catalyst. It is known that a large number of metal halides such as the halides of Be, B, Ti, V, Cr, Mn, Fe, Ni, Co, Zn, Zr, Sn, Sb, Bi, acids such as sulfuric acid, sulfonic acids, phosphoric acids, and the like, and even certain clays, etc., act similarly to aluminum halides in many reactions such as the polymerization of olefines, alkylation of aromatic hydrocarbons, etc., and it was assumed that of these catalysts at least some would prove to be active isomerization catalysts. However, all of these materials proved to be substantially inactive as isomerization catalysts. It is true that isomerization of certain saturated hydrocarbons to relatively small extents has been noted with such materials as zirconium chloride, beryllium chloride, molybdenum sulfide, and a mixture of boron fluoride and nickel under severe conditions, but processes utilizing these materials fail to attain yields and efficiency essential to practical commercial operation. It is now well known that the effectiveness of a catalyst in its application to other hydrocarbon reactions such as polymerization, alkylation, cracking, etc., is no criterion of its ability to catalyze the isomerization of saturated hydrocarbons.

I have investigated the use of liquid aluminum halide catalysts. The aluminum halides per se when used in the molten state are entirely unsuited as isomerization catalysts since at temperatures above their melting points they cause almost complete degradation of the hydrocarbon. It is known that the aluminum halides react with many other metal halides to form double compounds of the type $AlX_3.MeX_n$, wherein X represents an atom of chlorine or bromine, Me represents a metal, and n represents the valence of the metal Me, many of which are relatively low melting solids. Thus, aluminum chloride reacts with salts to form such double compounds as $AlCl_3.NaCl$, $AlCl_3.LiCl$, $AlCl_3.BaCl_2$, $AlCl_3.CaCl_2$, $AlBr_3.NaBr$, $AlBr_3.HgBr_2$. Double salts of this type have been frequently recommended as catalysts for polymerization and similar reactions. Double salts of this type were investigated, but were found, however, to be substantially devoid of any isomerizing activity. This, I believe, is due to the fact that the activity of the aluminum halide as an isomerization catalyst depends upon the presence of the secondary valence forces of the aluminum halide. In the complex double compounds these secondary valence forces are completely saturated. The use of such double salts containing an excess of the aluminum halide, i. e. solutions of aluminum halide in the melts of these double salts, were therefore investigated. These mixtures when they contain an appreciable excess of aluminum halide (for example, a mol ratio of aluminum halide to other metal halide of at least 1.2:1), are free-flowing liquids at relatively low temperatures and, it was found, possess an appreciable isomerization activity. This is illustrated by the following example.

Example I

One of the best of such catalyst mixtures consisting of aluminum chloride, sodium chloride and potassium chloride in the weight ratio of 8:1:1, respectively, was employed in the isomerization of normal butane under the following conditions:

Temperature_____ 100° C.
Contact time_____ 30 minutes
Normal butane_____ 55% by weight of the total charge
Catalyst_____ 39% by weight of the total charge
Hydrogen chloride____ 6% by weight of the total charge The conversion of n-butane to isobutane was 26%, that is, the hydrocarbon product contained 26% isobutane.

I have found and described in my copending application, Ser. No. 387,463, that the isomerizating activity of these fluid catalysts is strongly promoted by the halides of the metals of group V of the Mendeljeff system of the elements, and that the purely non-metallic element, phosphorus, in this group is not only devoid of any promoting ability, but exerts a decidedly negative effect upon the isomerizing activity of the fluid aluminum halide melts. Upon further investigation I have now found that in direct contrast to what might be expected from a study of the effect of the halides of the elements of group V upon the activity of these catalysts, the halides of the purely non-metallic and semi-metallic elements of group VI which constitute the sulfur group, strongly promote the fluid aluminum halide melts while the halides of the metals of group VI fail to display any appreciable promoting influence.

The halides of the elements of group VI which constitute the sulfur group are themselves devoid of any appreciable isomerizing activity. Their presence in small amounts, however, will promote the isomerizing ability of the aluminum chloride melts to a substantial degree. By the use of these superior promoted catalysts the isomerization of saturated hydrocarbons can be effected at considerably improved rates with excellent conversions. The use of these catalysts, furthermore, makes it possible to effect the isomerization in a commercially attractive and more practical manner.

The improved conversions obtainable using the promoted catalysts according to the invention are clearly illustrated in the following examples. These examples, it will be noted, are purposely chosen to be strictly comparable. Thus, in each case the material treated is pure butane and in each case, aside from the catalyst employed, the conditions are identical. It is to be understood, therefore, that these examples are set forth to demonstrate the superiority of the process of my invention and one suitable mode of operation.

Example II

Normal butane was isomerized under the conditions used in Example I, with a base catalyst of the same composition promoted with 1 per cent by weight of sulfur mono-chloride ($S_2Cl_2$). The conversion to isobutane obtained was 40.2 per cent. Comparing this result with that of Example I, it is seen that the presence of the promoter, in as small an amount as 1 per cent by weight of the catalyst, increased the conversion to about 155 per cent of that obtained with the unpromoted base catalyst.

Example III

Normal butane was isomerized under the conditions described in the foregoing examples using a base catalyst of the same composition promoted for isomerization with 1 per cent by weight of tellurium dichloride ($TeCl_2$). A conversion to isobutane of 36.3 per cent was obtained. Comparing this result with that of Example I, it is seen that the presence of 1 per cent of the promoter increased the conversion to about 140 per cent of that obtained with the unpromoted base catalyst.

It is apparent from the above examples, that considerably increased isomerization activity, as indicated by the conversions obtained during a relatively short period of contact time, is obtained by the use of even small amounts of the promoters. This is an entirely unexpected finding, particularly in view of the fact that these promoter substances, when used by themselves or in admixture with sodium chloride and/or potassium chloride show no isomerization activity whatsoever under the same conditions.

The process of the invention is applicable generally to the catalytic isomerization of isomerizable saturated hydrocarbons. Thus, it may be advantageously employed for the isomerization of saturated hydrocarbons containing at least four and preferably not more than nine carbon atoms. While the process is particularly adapted for the isomerization of open chain or paraffin hydrocarbons, it can also be advantageously applied for the isomerization of methyl cyclopentane, dimethyl cyclopentane, methyl cyclohexane, and similar naphthenic hydrocarbons. The process is particularly advantageous for the isomerization of butane and/or pentane. These hydrocarbons may be obtained in large quantities as individual compounds in a relatively pure state. The hydrocarbon treated, however, need not necessarily be a pure individual hydrocarbon, but may be a mixture of one or more hydrocarbons. Thus, the invention provides a practical process for converting the normal butane and normal pentane contents of commercial hydrocarbon mixtures such as are obtained from natural gases, petroleum distillates, cracked distillates, etc. to their valuable branched chain isomers. Especially suitable mixtures of hydrocarbons are the so-called butane-butylene fractions and pentane-amylene fractions from which unsaturated hydrocarbons have been substantially removed. Treatment of such mixtures obtained, for instance, as by-products in the sulfuric acid alkylation of isoparaffins results in materially increasing their contents of branched chain isomers and converting them to suitable raw materials for reuse in the alkylation process. Technical butane and pentane fractions such as those containing from 70% to 98% of the normal isomer and from 2% to 30% of the branched chain isomer may be conveniently treated in accordance with the process of the invention and their content of branched chain isomers materially increased without loss due to decomposition, and side reactions. Other mixtures of saturated hydrocarbons such as straight run gasoline, casinghead gasoline, etc., containing appreciable quantities of normal butane, normal pentane, cyclohexane, methyl cyclohexane, or lower boiling non-branched saturated hydrocarbons may be advantageously treated to produce products which are suitable for alkylation of olefins and have superior ignition characteristics. It is found that the greatest improvement in ignition characteristics is obtained when treating such hydrocarbon fractions boiling predominantly below 70° C.

The hydrocarbon or mixture of hydrocarbons treated is preferably substantially free of materials which are particularly prone to undergo side reactions such as degradation, polymerization, etc., under the reaction conditions. According to the preferred embodiment of the invention, excessive quantities of olefins, diolefins, or other detrimental impurities in the hydrocarbon or hydrocarbon mixture to be treated are removed prior to isomerization by a suitable treatment such as by a mineral acid refining, hydrogenation, or the like.

The saturated hydrocarbon or mixture of saturated hydrocarbons is isomerized, according to the process of the invention, using molten promoted catalysts of the above-described type. In the catalysts employed in the process of my invention, the aluminum halide is combined with at least one halide of the group consisting of the halides of Li, Na, K, Rb, Ca, Be, Mg, Zn and Cd. These metals, it will be noted, are all members of the first and second groups of the Mendeljeff system of the elements and all form easily fusible halide salts of closely related properties. They all react with aluminum halides to form double halide salts of the type described. Since, of the available aluminum halides, aluminum chloride and aluminum bromide are the least costly and most available, these halides are generally used as the aluminum halide components of the melts. The alkaline metal halide component or components are also generally the chloride and/or bromides. It is not essential, however, that the halides of the alkaline metal and aluminum correspond. Thus, I may use a suitable bromide and/or chloride in conjunction with aluminum bromide and/or chloride.

The ratio of aluminum halide to alkaline metal halide may vary within the scope of the invention in accordance with the particular characteristics of the catalyst desired, operating conditions, etc. As explained above, the aluminum halide must be used in molecular excess and is preferably used in mol ratio of 1.2 to 1, or greater. In general, mol ratios of aluminum halide above about 5 to 1 are not preferred since they require higher temperatures and consequently cause excessive degradation, especially when treating the less stable hydrocarbons. Particularly suitable catalysts comprise the aluminum halide and other metal halides in the ratios of proportions, between the above limits, corresponding to or approaching their eutectic mixtures.

These catalysts, which as shown above possess appreciable isomerization activity, are promoted and greatly improved by the incorporation of activating amounts of suitable promoters. Suitable promoters, I have found, comprise the halides of the non-metallic and semi-metallic elements constituting the sulfur group in Group VI of the Mendeljeff system of the elements. These elements comprise sulfur, selenium and tellurium. Halides of these elements suitable as promoters comprise, for example, $S_2Cl_2$, $S_2Br_2$, $Se_2Cl_2$, $SeCl_4$, $SeF_4$, $S_2I_2$, $Se_2I_4$, $TeBr_2$, $TeBr_4$, $TeCl_2$ and $TeCl_4$. These elements it will be noted have variable valences. In general, I prefer to employ the lower halides of these elements, for example, their mono- or di-chlorides.

The above-described halides of the elements constituting the sulfur group and including sulfur, selenium and tellurium, hereinafter referred to as promoters, are used in the base catalyst in minor proportions. Since they are in themselves inactive as catalysts, their use in more than necessary amounts serves only to dilute and reduce the activity of the catalyst as evidenced by the following example.

*Example IV*

Normal butane was isomerized under the conditions described in the foregoing examples using a base catalyst of the same composition to which was added 10 per cent by weight of sulfur monochloride ($S_2Cl_2$). The conversion to isobutane obtained was 27 per cent. Since the base catalyst with but 1 per cent of the promoter gives a conversion of 40.2 per cent the desirability of utilizing the promoters in small amounts is immediately apparent.

In general, the optimum promoting effect is found to correspond to concentrations in the catalyst in the order of 1 to 5 per cent. Amounts up to about 10 per cent and as low as 0.3 per cent, however, usually give improved results and may suitably be employed.

The isomerization when employing the above-described fluid catalysts is preferably effected in the presence of a hydrogen halide such as hydrogen chloride. This is preferably introduced into the reaction zone with the hydrocarbon feed and, if desired, recovered from the product by conventional methods and recycled through the reaction zone. The amount of hydrogen halide used may vary widely in accordance with the nature of the charge, the catalyst activity, and the operating conditions. In such cases where it is not desired to recover and recycle the hydrogen halide, minimum quantities, such as from about 0.3% to 5% of the hydrocarbon feed are usually employed. When the hydrogen halide is recovered and recycled, however, much larger quantities, for instance up to at least 25% of the hydrocarbon charge, may be economically employed. Also, if desired, in order to inhibit cracking and other undesirable side reactions, a limited amount of hydrogen may be introduced with the hydrogen halide. Inert materials such as pumice, coke, brick chips and the like, and gases such as $CO$, $CO_2$, $N_2$, $CH_4$, etc., appear to exert no deleterious effect upon the activity of the catalyst and may be present in the reaction zone. Water and hydrogen sulfide, however, are detrimental and are excluded as far as practical.

The isomerization, according to the present process, may be executed at temperatures ranging from the minimum temperature at which the catalyst may be maintained in the fluid state up to approximately 200° C. The minimum temperatures at which the catalyst may be maintained in a mobile liquid state depends upon the composition of the particular catalyst. By combining $AlCl_3$ and/or $AlBr_3$ with suitable proportions of NaCl, KCl or $ZnCl_2$, and preferably a mixture of two or more of these salts, for instance, very desirable base catalysts may be produced which may be employed as free-flowing liquids at temperatures in the order of 100° C.–130° C. and even lower.

Pressure appears to have little influence upon the isomerization reaction. When effecting the isomerization in the vapor phase pressures ranging from about atmospheric pressure up to about 250 pounds per square inch are usually most advantageously employed. When effecting the isomerization in the liquid phase the pressure is, of course, always sufficient to maintain at least a substantial portion of the hydrocarbon feed in the liquid phase at the operating temperature. Higher pressures may, however, be used, if desired.

The described fluid promoted catalyst may be employed in the process of the invention for the isomerization of saturated hydrocarbons in either the liquid or vapor phase. The vapor phase isomerization of butane using these promoted catalysts is a very attractive process. Higher hydrocarbons and hydrocarbon mixtures, on the other hand, are usually more advantageously isomerized in the liquid phase.

The isomerization may be carried out either batchwise or continuously and with either concurrent or countercurrent flow of the hydrocarbon and fluid catalyst. Thus, the process may be effected in simple apparatus of conventional type such as stirring autoclaves, packed towers, tubular reactors, and the like.

The process of my invention utilizing the described promoted fluid catalysts has many advantages over hitherto-proposed isomerization processes. In my process, due to the excellent contact obtained with the fluid catalyst and the greatly improved isomerizing activity resulting from the use of activating amounts of the described promoters, excellent and practical conversions may be obtained at much greater throughput rates. The isomerization may be executed continuously under relatively mild operating conditions in simple apparatus of conventional designs, and difficulties hitherto encountered due to agglomeration of solid aluminum chloride and volatilization of the catalyst are eliminated.

I claim as my invention:

1. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by from 0.3% to 10% of sulfur monochloride, whereby isomerization is effected as the primary reaction.

2. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by from 0.3% to 10% of selenium monochloride, whereby isomerization is effected as the primary reaction.

3. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by from 0.3% to 10% of tellurium dichloride, whereby isomerization is effected as the primary reaction.

4. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by from 0.3% to 10% of a halide of sulfur, whereby isomerization is effected as the primary reaction.

5. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by from 0.3% to 10% of a halide of selenium, whereby isomerization is effected as the primary reaction.

6. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by from 0.3% to 10% of a halide of tellurium, whereby isomerization is effected as the primary reaction.

7. A process for isomerizing saturated hydrocarbons which comprises contacting an isomerizable saturated hydrocarbon under isomerizing conditions with a fluid melt comprising a molecular excess of aluminum chloride and a halide of an alkali metal promoted by an activating amount of a chloride of an element selected from the group consisting of sulfur, selenium and tellurium, whereby isomerization is effected as the primary reaction.

8. A process for isomerizing saturated hydrocarbons which comprises contacting an isomerizable saturated hydrocarbon under isomerizing conditions with a fluid melt comprising an aluminum halide, a halide of sodium and a halide of potassium in the weight ratio of about 8:1:1 promoted by an activating amount of a halide of an element selected from the group consisting of sulfur, selenium and tellurium, whereby isomerization is effected as the primary reaction.

9. A process for isomerizing saturated hydrocarbons which comprises contacting an isomerizable saturated hydrocarbon under isomerizing conditions with a fluid melt comprising a molecular excess of an aluminum halide, a halide of sodium and a halide of potassium promoted by an activating amount of a halide of an element selected from the group consisting of sulfur, selenium and tellurium, whereby isomerization is effected as the primary reaction.

10. A process for isomerizing saturated hydrocarbons which comprises contacting an isomerizable saturated hydrocarbon under isomerizing conditions with a fluid melt comprising a molecular excess of an aluminum halide and a halide of an alkali metal promoted by an activating amount of a halide of an element selected from the group consisting of sulfur, selenium and tellurium, whereby isomerization is effected as the primary reaction.

11. A process for isomerizing butane which comprises contacting butane under isomerizing conditions with a fluid melt comprising a molecular excess of an aluminum halide and a halide of an alkali metal promoted by an activating amount of a halide of an element selected from the group consisting of sulfur, selenium and tellurium, whereby isomerization is effected as the primary reaction.

12. A process for isomerizing saturated hydrocarbons which comprises contacting a saturated hydrocarbon having from four to nine carbon atoms under isomerizing conditions with a fluid melt comprising a molecular excess of an aluminum halide and a halide of an alkali metal promoted by an activating amount of a halide of an element selected from the group consisting of sulfur, selenium and tellurium, whereby isomerization is effected as the primary reaction.

13. A catalyst particularly effective in the isomerization of hydrocarbons, which comprises a fluid melt comprising a molecular excess of aluminum chloride and a halide of an alkali metal promoted by from 0.3 per cent to 15 per cent of a halide of an element selected from the group consisting of sulfur, selenium and tellurium.

14. A catalyst particularly effective in the isomerization of hydrocarbons, which comprises a fluid melt comprising a molecular excess of an aluminum halide and a halide of an alkali metal promoted by from 0.3 per cent to 15 per cent of a chloride of an element selected from the group consisting of sulfur, selenium and tellurium.

15. A catalyst particularly effective in the isomerization of hydrocarbons, which comprises a fluid melt comprising a molecular excess of an aluminum halide and a halide of an alkali metal promoted by from 0.3 per cent to 15 per cent of a halide of an element selected from the group consisting of sulfur, selenium and tellurium.

HARRY A. CHENEY.